US005093409A

United States Patent [19]
Buckmaster

[11] Patent Number: 5,093,409
[45] Date of Patent: Mar. 3, 1992

[54] PROCESS FOR THE STABILIZATION OF FLUOROPOLYMERS

[75] Inventor: Marlin D. Buckmaster, Vienna, W. Va.

[73] Assignee: E. I. du Pont de Nemours and Company, Wilmington, Del.

[21] Appl. No.: 673,065

[22] Filed: Mar. 21, 1991

Related U.S. Application Data

[60] Division of Ser. No. 543,781, Jun. 7, 1990, Pat. No. 5,045,605, which is a continuation-in-part of Ser. No. 199,443, May 27, 1988, Pat. No. 4,946,902.

[51] Int. Cl.$^5$ ............................................. C08L 27/12
[52] U.S. Cl. .................................. 524/544; 252/511; 524/545; 524/546
[58] Field of Search ................ 252/511; 524/544, 545, 524/546

[56] References Cited

U.S. PATENT DOCUMENTS

| | | |
|---|---|---|
| 3,085,083 | 4/1963 | Schreyer . |
| 3,674,758 | 7/1972 | Carlson . |
| 4,265,789 | 5/1981 | Christopher et al. ............... 252/511 |
| 4,434,273 | 2/1984 | Uschold . |
| 4,568,851 | 2/1986 | Soni et al. ........................... 310/330 |
| 4,599,386 | 7/1986 | Carlson et al. . |
| 4,664,846 | 5/1987 | Enjo et al. . |
| 4,675,380 | 6/1987 | Buckmaster et al. . |
| 4,742,122 | 5/1988 | Buckmaster et al. ............ 525/326.2 |
| 4,743,658 | 5/1988 | Imbalzano et al. . |
| 4,902,444 | 2/1990 | Kolouch . |

Primary Examiner—Bernard Lipman

[57] ABSTRACT

Thermally and hydrolytically stable fluorocopolymers, especially melt-processible fluorocopolymers, for example, tetrafluoroethylene/hexafluoropropylene copolymers, having —COOH and/or —COF groups on the polymer chains are contacted and reacted with a secondary or tertiary amine and heated at 160°–400° C. for a time sufficient to convert —COOH and/or —COF groups to stable —CF$_2$H groups, the resultant stabilized copolymers being useful, for example, in electrically conductive compositions having a good combination of melt flow and electrical conductivity.

4 Claims, No Drawings

PROCESS FOR THE STABILIZATION OF FLUOROPOLYMERS

CROSS-REFERENCE TO RELATED APPLICATION

This is a division of application Ser. No. 07/543,781 filed June 7, 1990 now U.S. Pat. No. 5,045,605, under the provisions of the Patent Cooperation Treaty (PCT). The PCT application was filed May 25, 1989 as a continuation-in-part of application Ser. No. 07/199,443 filed May 27, 1988 and issued Aug. 7, 1990 as U.S. Pat. No. 4,946,902.

BACKGROUND OF THE INVENTION

1. Field of the Invention

This invention relates to a process for the stabilization of certain fluoropolymers, especially those useful in many high technology applications.

2. Background

Many fluoropolymers are known in the art. They include especially various copolymers of two or more comonomers such as, for example, tetrafluoroethylene (TFE), hexafluoropropene (HFP), chlorotrifluoroethylene (CTFE), perfluoro(methyl vinyl ether) (PMVE), perfluoro(propyl vinyl ether) (PPVE), and perfluoro(2,2-dimethyl-1,3-dioxole) (PDD).

Such copolymers may be melt-processible and thus can be fabricated at high temperatures. However, they frequently suffer some deterioration during high temperature processing and thus lose some of their desirable properties such as, for example, freedom from bubbles. This thermal deterioration can be traced to the presence of various labile end groups, such as, e.g., carboxyl (—COOH) and fluorocarbonyl (—COF). The former tends to eliminate carbon dioxide at high temperatures, while the latter, while more thermally stable, nevertheless tends to hydrolyze in the presence of moisture, which normally cannot be completely avoided, and is converted to carboxyl groups. Such hydrolysis also results in the evolution of hydrofluoric acid which is corrosive to most materials of industrial importance, including many metals, glass and quartz.

The removal of unstable end groups has long been an important part of the technology of perfluorinated melt-processible copolymers of TFE. Schreyer, U.S. Pat. No. 3,085,083, discloses the treatment of such polymers "with water, preferably in the presence of inorganic compounds having a pH of at least 7, such as stable bases, . . . at a temperature of 200°–400° C., and recovering a fluorocarbon polymer having at least half of all the end-groups in the form of difluoromethyl groups" (—CF$_2$H). There is no suggestion in this patent, which discloses the use of inorganic treating agents, of the unexpected results achieved by means of this invention which requires the use of secondary or tertiary amines.

Buckmaster et al., U.S. Pat. No. 4,675,380, disclose the fluorination of melt-processible TFE copolymers which have been coagulated by stirring in the presence of a mineral acid and a water-immiscible liquid and then isolated. The total number of unstable end groups was reduced to less than 80 per $10^6$ carbon atoms.

U.K. Patent 1,210,794 to Du Pont discloses the fluorination of fluorocarbon copolymers to reduce the number of unstable end groups. The process of that patent, when carried out with some of the copolymers of interest in the present invention, needs to employ a fluorination temperature of at least 225° C. to remove unstable end groups.

Although fluorination of fluoropolymers can be employed to reduce the concentration of multiple bonds and unstable end groups, complete fluorination requires high temperatures, usually above 200° C., to remove substantially all —COF groups. However, if the polymers soften or begin melting at the fluorination temperature, such a process causes agglomeration of polymer particles, which leads to difficulties in their further handling and processing.

Furthermore, high temperature fluorination can cause equipment corrosion, and it is difficult to handle fluorine safely because it is toxic and is a strong oxidizing agent. It would be desirable to be able to remove —COOH and —COF groups from fluoropolymers without the use of fluorine, and preferably without having to heat the polymer above its melting point.

Carbon- and graphite-filled fluorocarbon compositions for electrical applications have been known for some time. They are primarily used in preference to other conductive polymers when chemically active and/or high temperature environments are to be encountered. Applications in which conductive fluorocarbons containing carbon black and/or graphite are used include current-limiting devices, e.g., self-regulating heater cable (U.S. Pat. Nos. 4,318,881, 4,624,990 and 4,545,926), antistatic containers for semiconductor chip processing (J6 1027842A), conductive coating compositions (U.S. Pat. Nos. 4,482,476, 4,064,074 and EP 79589), battery electrode constructions (U.S. Pat. Nos. 4,468,362, 3,676,222, EP 126511A and JA 7016669 R), thermally and electrically conductive caulk (U.S. Pat. No. 4,157,327), antistatic/antifriction sheets for use in tape or film cassettes (U.S. Pat. No. 3,908,570) and conductive filaments (J 58163725A and J 75013957).

However, there are difficulties associated with adding carbon black to fluoropolymers to achieve conductivity. One difficulty is the relatively large and rapid rise that occurs in effective melt viscosity of the blend as carbon black is added. This large and rapid viscosity increase results in more difficult and time consuming processing. At low enough levels of carbon black to be of little influence on effective melt viscosity, the electrical conductivity is usually lost or in a range below that desired. Any means to reduce melt viscosity and/or reduce the carbon black concentration to lower levels, while maintaining the desired conductivity, is a very desirable goal.

SUMMARY OF THE INVENTION

This invention provides a process for improving the thermal and hydrolytic stabilities of a copolymer of at least two comonomers selected from the group consisting of tetrafluoroethylene (TFE), chlorotrifluoroethylene (CTFE), R$_f$CF=CF$_2$ wherein R$_f$ is a primary fluoroalkyl group of 1-5 carbon atoms, R$_g$OCF=CF$_2$ wherein R$_g$ is R$_f$ or a primary fluoroalkyl group containing ether oxygen and 4-12 carbon atoms, and a fluorodioxole having the following formula

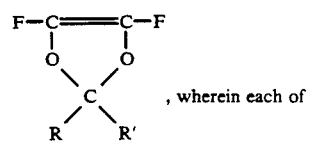

, wherein each of

R and R', independently, is fluorine or trifluoromethyl, said copolymer having —COOH and/or —COF groups on the polymer chains, said process comprising contacting said copolymer at a temperature of about 160°–400° C. with at least a catalytic, preferably a stoichiometric amount based on the concentration of —COOH and/or —COF groups present in the copolymer, of an anhydrous or aqueous secondary or tertiary amine having a boiling point at atmospheric pressure of no greater than 200° C., preferably less than 150° C., for a time sufficient to convert —COOH and/or —COF groups into stable —CF$_2$H groups, removing volatiles from the reaction product, and recovering copolymer having a reduced number of —COOH and/or —COF groups.

When the process is carried out under optimum conditions, the product copolymer is substantially free of —COOH and —COF groups.

The invention also includes conductive compositions made from —CF$_2$H group-containing copolymers and conductive carbon black.

DETAILED DESCRIPTION OF THE INVENTION

The fluorinated copolymers defined above and of interest in carrying out the process of the invention may be predominantly crystalline, predominantly amorphous, or completely amorphous. When particles of predominantly crystalline polymers are heated above their melting points, they stick together, and this is undesirable for the process of this invention. When particles of amorphous or predominantly amorphous polymers are heated above their glass transition temperature, they may stick together. For the purpose of this invention, the softening temperature is defined as the temperature where particles of the polymer stick together. Since it is desired that the polymer particles should not stick to one another, the process temperature should not exceed the softening temperature.

The preferred copolymers used in the process of the present invention are melt-processible. For the purpose of the present description and claims, the term "melt-processible" means that the polymer can be fabricated into shaped articles, such as coated wire or molded objects, in melt processing equipment, such as, e.g., extruders or injection-molding equipment.

In the preferred R$_f$CF=CF$_2$ comonomer, R$_f$ is a perfluoroalkyl group, especially CF$_3$. In the preferred R$_g$OCF=CF$_2$ comonomer, the R$_g$ is a perfluoroalkyl group, especially —CF$_2$CF$_2$CF$_3$, or an oxygen-containing perfluoroalkyl group.

The starting copolymers which are to be stabilized by the process of this invention have —COF and/or —COOH groups, the latter being easier to remove than —COF groups. It is to be understood that the —COF and —COOH groups, also referred to hereinafter as "reactive groups," may be at the ends of polymer chains, or they may be internally located on polymer chains, for example, on pendant chains, also known as "side chains," along the main or backbone polymer chains.

Although not wishing to be bound by any interpretation of the reactive group chemistry, it is believed that the reaction of secondary or tertiary amines with the —COF or —COOH groups at room temperature or above leads to the formation of amine salts, which are readily converted at 160°–400° C. to —CF$_2$H groups by decarboxylation. The presence of water with the secondary or tertiary amine is preferred, since aqueous conditions promote the salt formation by conversion of —COF groups to —COOH groups.

The copolymerization of appropriate monomers to form the starting copolymers to be stabilized according to the process of the present invention is conducted in a generally known manner. The initiator should be non-telogenic, which means that it does not cause a reduction of the molecular weight of the copolymer below the desired level. Redox initiators, such as, for example, ammonium persulfate/SO$_3^=$, BrO$_3^-$/S$_2$O$_5^=$, and HOCl/SO$_3^=$, can be used at any convenient temperature, since the generation of free radicals occurs when the two components react.

Persulfates, such as, for example, ammonium persulfate or potassium persulfate; peroxides, such as, for example, disuccinyl peroxide; and mixtures of persulfates and peroxides can also be used as initiators. In the case of nonaqueous copolymerization, initiators soluble in organic solvents can be used.

Each initiator is used at a temperature such that its decomposition results in the formation of free radicals at a convenient rate. These temperatures are known in the art.

When the reaction medium is water, it is desirable to use a non-telogenic dispersing agent to maintain the copolymer in dispersion during the polymerization. Suitable dispersing agents are known in the art; typical ones include the ammonium salts of perfluorooctanoic acid and perfluorononanoic acid. The selection of the initiator and dispersing agent is not critical except as described above.

In order to obtain an homogeneous copolymer, especially in a semi-batch process, it is desirable to have a substantially constant concentration of free radicals and a substantially constant ratio of monomers present, to make a copolymer having a substantially constant composition. Another way to obtain constant composition is to use a continuous polymerization, especially when operating on a rather large scale.

One way to achieve a substantially constant concentration of free radicals is to use a redox initiator, which produces free radicals as fast as the redox components are mixed together. Another way to achieve a substantially constant concentration of free radicals is to add initiator continuously while polymerizing at a temperature at which the initiator half-life is short.

The initial ratio of comonomers charged to the reactor is selected to provide a copolymer with the desired comonomer content. This initial ratio can be calculated from the respective reactivities of the comonomers.

As the polymerization progresses in a semi-batch process, additional comonomers are added to maintain the substantially constant reaction environment. These additions can be made continuously or in frequent batch additions.

The additions of comonomers and initiator should continue until the polymerization is at least 60% complete, preferably until it is at least 80% complete, and ideally until it is complete. If the additions of comonomers continue until the polymerization is about 80% complete, further polymerization will not significantly change the ratio of comonomers present. One skilled in the art will be able to adjust the conditions and rates of addition so as to obtain a copolymer having a constant composition.

The polymerization pressure is not critical and is determined largely by the temperature, amount of the less reactive comonomer desired in the product, and the desired rate of polymerization.

The copolymers can be isolated after aqueous copolymerization by coagulating the dispersion by stirring more vigorously than during copolymerization. Coagulating agents can be employed in a manner generally described in U.S. Pat. No. 4,451,616 to Kawachi et al and U.S. Pat. No. 4,368,296 to Kuhls et al. Alternatively, the coagulation method used in U.S. Pat. No. 4,675,380 to Buckmaster et al can be used, giving a non-water-wet copolymer in the form of small particles, such as granules or small pellets.

Usually, when a water-immiscible liquid is added to the gelled copolymer dispersion, the amount of water-immiscible liquid is 0.25 to 3.0 parts per part of copolymer on a dry weight basis. Preferably, the water-immiscible liquid should have a surface tension of not more than 35 dynes/cm at 25° C., and it should have a normal boiling point in the range of 30°-150° C. Typical examples of the immiscible liquid include aliphatic hydrocarbons, such as hexane, heptane, gasoline and kerosene, or mixtures thereof; aromatic hydrocarbons, such as benzene, toluene and xylene; halogenated hydrocarbons, such as carbon tetrachloride, monochlorobenzene, the trichlorotrifluoroethanes, difluorotetrachloroethanes, and liquid oligomers of chlorotrifluoroethylene. Following the formation of copolymer particles as a result of stirring with one of the above organic liquids, the organic liquid is removed by the application of heat and/or reduced pressure. At this stage, the copolymer particles are essentially no longer water-wettable. The particle size depends to some extent on the particular organic liquid used and the ratio of its weight to that of the copolymer.

When a gelling agent is used, a secondary or tertiary amine can be used as the gelling agent in place of the usual strong acid gelling agent, such as nitric acid. The amine is a effective gelling agent and provides an advantage in that, in accordance with the previously described postulation, the amine salt of any carboxylic acid ends is formed. When the polymer is subsequently dried and heated to at least about 160° C. for a sufficient time, in accordance with the process of this invention, the amine salt is believed to decarboxylate to give copolymer with stable hydride groups, $-CF_2H$.

Nonaqueous polymerization also can be carried out in a constant environment, producing a copolymer having constant composition. Some copolymers made in a nonaqueous medium contain $-COF$ end groups, and they too can be stabilized by the process of this invention, as described further hereinafter.

Fluoropolymers, such as $TFE/CF_2=CFOCF_2CF_2CF_3$ copolymers, made by nonaqueous polymerization can be isolated as granules, as described in U.S. Pat. No. 4,714,756 to Buckmaster, or can be isolated as a powder by evaporation of the polymerization diluent. If a secondary or tertiary amine is added with the water in the process of U.S. Pat. No. 4,714,756, the $-COF$ and $-COOH$ groups are converted to amine carboxylate salts which can be decomposed to stable $-CF_2H$ by heating the polymer to at least 160° C. during drying or in a separate step, such constituting the process of the invention. If the polymer is extruded to pelletize it, decarboxylation of the amine carboxylate salt can take place during the extrusion process.

The following description is directed to the process of the invention and can be considered as a copolymer stabilization.

When an aqueous polymerization is used to prepare the copolymer which is to be subjected to the process of this invention, the aqueous dispersion is coagulated or optionally gelled, e.g., by addition of a secondary or tertiary amine, or concentrated nitric acid, or some other electrolyte, and a water-immiscible liquid may be added to the gel with continuing agitation. The gel breaks into separate phases of water and non-water-wetted copolymer particles.

The principal reaction of the copolymer $-COOH$ and $-COF$ groups with a secondary or tertiary amine to facilitate a subsequent conversion to $-CF_2H$ groups can be carried out either on filtered and dried copolymer or directly on the copolymer-water mixture obtained in the polymerization step. Suitable amines include, but are not limited to, diethylamine, dipropylamine, triethylamine, piperidine, morpholine, dodecyldimethylamine and benzyldimethylamine. All these organic amines have adequate water solubility and adequately high boiling points to prevent their premature loss during coagulation. Low molecular weight and high water solubility of the amines increase their rate of reaction with (or rate of diffusion into) the copolymer. The rate of reaction also increases greatly with the temperature, which preferably should not exceed the Tg for amorphous copolymers.

After the reaction with amine is completed, for example, at 25°-150° C., preferably 75°-150° C., the copolymer particles are separated from the aqueous phase, optionally washed to remove excess amine, and dried at, for example, about 160°-400° C., but below the softening temperature of the copolymer, preferably at a reduced pressure and with a purge of inert gas, such as, e.g., nitrogen. Among the volatiles that may come off during this drying are water, the amine, $CO_2$, and perhaps HF. In the case of PDD copolymers, off-gases should be handled with care since toxic hexafluoroacetone and perfluoroisobutylene may be formed by the decomposition of the PDD copolymer.

As an alternative, the reaction with amine can be carried out in a separate step after copolymer coagulation and drying. In that case, it is preferably done at about 75°-150° C. until no absorbance in the range 1780-1885 cm$^{-1}$ is evident in a Fourier transform infrared spectroscopy scan of a compression molded copolymer film. The amount of base should be at least stoichiometric, based on the amount of $-COF$ and $-COOH$ groups, but a larger amount is more convenient. The reaction rate increases with excess base. There is no critical upper limit for this excess.

Following the reaction with amine, the copolymer is separated from the amine by any convenient means, such as, e.g., filtration, centrifugation or evaporation of amine, and heated at 160°-400° C. to convert the amine salt to the $-CF_2H$ group. The apparatus in which this heating is conducted is not critical. For example, it can be an oven, a tubular reactor, a continuous drier, or a melt extruder.

Alternatively, the untreated copolymer can be melt-processed into film or filament or small cubes or pellets or any shape with large surface to volume ratio and then treated with the amine, preferably wet, in the vapor phase at 160°-400° C., but preferably not above the softening temperature of the copolymer. The product is then dried, preferably with a purge of inert gas. This alternative requires relatively long exposure times or high temperatures, because the treating agent must diffuse into the polymer and the reaction products must diffuse out.

Another alternative is to place the dry or damp untreated copolymer powder in a tube which is heated to a temperature in the range 160°–400° C., but preferably not above the softening temperature of the copolymer, and pass wet secondary or tertiary amine over the bed of polymer until the —COOH and/or —COF groups are converted into —CF$_2$H groups. The product is then purged and dried, in place or in a drier. The salt formation and salt decomposition take place in a single step.

When an attempt is made to use ammonia or a primary amine in the process of this invention, a starting copolymer containing —COF groups is converted partially or predominantly to a copolymer containing undesirable amide groups. If the starting copolymer contains —COOH groups, the ammonium or amine salt forms, but when it is further heated to at least 160° C., a mixture of amide and carboxylic acid groups are produced. Therefore, ammonia and primary amines are not suitable for use in the present invention.

When a secondary or tertiary amine is used, substantially all —COOH and —COF groups are converted to the amine carboxylate salt, which upon heating to about 160°–400° C. provides hydride groups (—CF$_2$H). Preferably, the amine should be a strong base, with a pKa of at least 10. If a weak amine, such as pyridine, is used, the amine carboxylate salt decomposes but is converted back to —COOH groups. With amines of intermediate strength, some decarboxylation occurs and some —COOH groups are regenerated. Secondary and tertiary amines give complete removal of —COOH and —COF groups if they are used in excess, in a confined atmosphere, for example, in a closed system or under a constant flow of excess amine, at the requisite temperature, for a sufficient period of time.

The time required for decomposition of the amine carboxylate salt is highly dependent on temperature, as shown in Table 1. In the table a TFE/HFP copolymer with —COOH groups is treated with diethylamine at low temperature to form the salt, which is then heated at a selected temperature to decompose it.

TABLE 1

| Heating Temperature (°C.) | Time for 80% Decomposition |
|---|---|
| 150 | excessive |
| 160 | 120 min |
| 195 | 40 min |
| 210 | 10 min |

Stabilized copolymers made in accordance with the process of this invention may be colored. If it is important for some use to have a completely colorless polymer product, the color may be removed by fluorination of the dried polymer at a temperature below the softening temperature. The conditions of fluorination may be those disclosed in the prior art.

However, for some uses color is unimportant. For example, the stable copolymer product of this invention can be blended with conductive carbon black to make a conductive, thermally and hydrolytically stable composition. In fact, such a composition has a remarkably better combination of high conductivity and low melt viscosity than a control composition made are converted to —CF$_2$H.

Previously, the only known way of obtaining this combination of high conductivity and low melt viscosity was by exhaustive fluorination of the copolymer to give —CF$_3$ groups. These are stable, as are —CF$_2$H groups. As will be apparent to one skilled in the art, the process of this invention provides an advantage in its simplicity. For example, the amines used in the present process are liquids and can be handled in a relatively simple and safe manner.

The conductive carbon blacks useful herein to provide conductivity are well known materials. They are described in U.S. Pat. No. 4,624,990 and in "Conductive Thermoplastic Composites," Rubber World, November 1955, pp. 30 et seq. The carbon black in particulate form can be melt blended with the copolymer. The amount of carbon black added is generally about 1 to 20 weight percent of the blend, preferably 1 to 10 weight percent, and most preferably 1 to 6 weight percent. This amount is sufficient to provide good conductivity of the blend and does not increase the melt viscosity excessively.

Test Procedures

DC electrical resistivity was determined using a Keithley Model 617 programmable electrometer controlled and monitored by a Hewlett Packard Model 300 computer. Resistance can be determined from the electrometer and the resistivity calculated from the equation $$Rho = R(A/L)$$

wherein Rho is the resistivity in ohm-cm, R is the resistance in ohms, A is the sample cross sectional area in cm$^2$ and L is the length between the electrodes on the sample, in cm. Samples are compression-molded plaques cut to strips nominally 15×1.3×0.3 cm.

Electrodes on the sample were formed using silver paint (SC 20 from Micro-Circuits Co.) applied in a strip about one-half centimeter wide and several centimeters apart along the major dimension of the sample. Suitable clamps such as a horizontal action toggle clamp, mounted on a phenolic resin board, are then adjusted snugly to the sample over the silver painted ends. The electrometer leads are connected to the toggle clamps to complete the circuit for the resistance measurement.

Melt flow number (MFN) is based on the melt flow rate from a melt viscometer using a 5000 g total mass piston and weight after 5 minutes residence time at 372°±1° C. The orifice is 0.0825 inch±0.002 inch (0.21±0.005 cm) diameter with a 0.315 inch±0.005 inch (0.8±0.013 cm) land length. A polymer charge of about 5 grams is rapidly charged into the viscometer bore with the orifice in place and the sample is compacted with the unloaded piston. At 4.5 minutes (270 seconds) after initial charging, the weight is placed on the piston. Total weight of piston and weight is 5000 grams. At exactly 5 minutes (300 seconds) the extrudate is cut and discarded. After 6 minutes (360 seconds) the extrudate is cut and weighed. The weight of the extrudate is determined, multiplied by ten, and the calculated weight per 10 minutes is recorded as the melt flow number.

Reactive group analysis of the copolymer was carried out on thin (0.25–0.30 mm) films molded at an appropriate temperature using a heated platen press. The films are scanned on a Nicolet Model 5DX Fourier Transform infrared spectrometer. All operational settings used were those provided as default settings in the Nicolet control software, except for the number of scans collected before the transform was performed (40 scans vs. 10 scans in default mode).

Similarly, a film of a reference material known to have none of the reactive groups to be analyzed is molded and scanned. The reference absorbance spectrum is subtracted from the sample absorbance, using the interactive subtraction mode of the software. The —$CF_2$— overtone band at 4.25 micrometers (2353 cm$^{-1}$) is used to compensate for the thickness differences between sample and reference during this interactive subtraction. The difference spectrum, in two ranges, 5.13 to 5.88 micrometers (1950-1700 wave numbers in cm$^{-1}$) and 2.7 to 3.45 micrometers (3700-2900 wave numbers in cm$^{-1}$), represents the absorbances due to the reactive groups.

Calibration factors (CF) to allow calculation of reactive group per million carbon atoms were determined from the absorbance of model compounds. Table 2 below presents wavelengths and calibration factors for determining reactive groups via the equation:

Reactive groups/$10^6$ carbon atom = absorbance × CF/film thickness in mils

TABLE 2

| Reactive Group | Wavelength (cm$^{-1}$) | Calibration Factor (CF) |
|---|---|---|
| —COF | 1883 | 17,000 |
| —$CO_2H$ | 3555 | 20,000 |
| —$CF_2H$ | 3008 | 870,000 |
| —$CONH_2$ | 3440 | 37,000 |

The sensitivity of the analysis for —COF and —COOH groups in TFE/PPVE copolymers is 2-3 groups/$10^6$ carbon atoms. This means that a measurement of zero groups/$10^6$ carbon atoms indicates that there are no more than 3 groups/$10^6$ carbon atoms.

Reactive group concentrations in TFE/PDD copolymers were measured by Fourier transform infrared spectroscopy (FTIR). Copolymer samples were prepared for measurement by compression molding a film between 51 and 255 micrometers thick at a temperature approximately 100° C. above the Tg of the copolymer. The molded film was mounted and placed in a Perkin-Elmer model 1750 or Nicolet Model 5DX FTIR spectrometer and scanned for multiple scans between 4000 and 450 cm$^{-1}$ at a resolution of 2 cm$^{-1}$. The resulting spectrum was then plotted with expanded abscissa in absorbance mode. The band at 1929 cm$^{-1}$ was used as an internal thickness band. Absorbance for this band was measured using a baseline drawn between about 1980 cm$^{-1}$ and 1890 cm$^{-1}$. Acid fluoride was determined from the absorbance at 1883±2 cm$^{-1}$, with the baseline for this band being drawn between about 1890 cm$^{-1}$ and 1858 cm$^{-1}$. The ratio of the absorbance at 1883 cm$^{-1}$ to the absorbance at 1929 cm$^{-1}$ was defined as the "acid fluoride index" (AFI):

AFI = $A_{1883}/A_{1929}$, where $A_{1883}$ = absorbance at 1883 cm$^{-1}$ and $A_{1929}$ = absorbance at 1929 cm$^{-1}$.

The acid fluoride band at 1883 cm$^{-1}$ was calibrated using perfluoro(2,2-dimethyl-4-fluoroformyl-1,3-dioxolane) as a model compound. Five solutions, having known concentrations in the range of 10-250 milliequivalents of acid fluoride per kilogram in perfluoro(1-butyltetrahydrofuran) were made up and absorbances determined with a Perkin-Elmer 1750 FTIR spectrometer using the acid fluoride band at 1887 cm$^{-1}$. The thickness band at 1929 cm$^{-1}$ was calibrated by measuring the absorbance as a function of film thickness for copolymer samples having thicknesses between 51 and 510 micrometers. It was found from these calibrations that C = 12.3 × AFI, where C is the concentration of acid fluoride (—COF) groups in milliequivalents per kilogram of copolymer, and AFI is the above acid fluoride index.

A relative measure of carboxylic acid group concentration in TFE/PDD copolymers was obtained by FTIR. A copolymer sample was prepared as before and scanned in the same equipment and in the same manner. The resulting spectrum was then plotted in absorbance mode. The band at 1929 cm$^{-1}$ was used as an internal thickness band, and absorbance for this band was measured as before. Carboxylic acid was determined from the absorbance at 1810±2 cm$^{-1}$, with the baseline for this band being drawn between about 1830 cm$^{-1}$ and 1800 cm$^{-1}$. The ratio of the absorbance at 1810 cm$^{-1}$ to the absorbance at 1929 cm$^{-1}$ is defined as the "carboxylic acid index" (CAI):

CAI = $A_{1810}/A_{1929}$, where $A_{1810}$ = absorbance at 1810 cm$^{-1}$ and $A_{1929}$ = absorbance at 1929 cm$^{-1}$.

Composition Preparation

Electrically conductive fluoropolymer compositions were prepared in a laboratory batch mixer. The mixer was a Rheomix 3000 manufactured by Haake Bucheler Corp. controlled and driven with Haake's Rheocord 40 microprocessor controlled torque rheometer. The unit consists of a closed mixing chamber in which dual counter-rotating rotors turn at different gear ratios to provide intensive mixing. Temperature and rotor speed of the mixer are controlled by adjustment within the Rheocord and torque and melt temperature are monitored by the unit. The rotors used were the roller type. The product removed from the mixer after melt blending was in relatively large chunks, which were cut into small pieces suitable for molding, and in some cases these small pieces were ground into a powder before molding.

Although not exemplified herein, electrically conductive fluoropolymers, if desired, can be prepared on a twin screw extruder with co-rotating screws. The ingredients are blended and fed to the extruder where they are melted, mixed, and extruded into strands which are cut into pellets for molding. The conductive compositions of the invention can be prepared by single screw or twin screw extrusion, provided there is a level of mixing to provide an intimate admixture of components.

Molding

Plaques were prepared from the compositions made in the mixer by compression molding the material in a heated 20-ton Pasedena Hydraulics Inc. hydraulically driven press maintained at 350° C. The piston diameter of the press is 4 inches (10.2 cm) and the press platens are 8 inches (20.3 cm) square. A chase with a 15×15 centimeter square opening was used to contain the polymer. The chase was nominally one millimeter thick. Aluminum foil placed on either side of the chase containing the polymer helped contain the polymer and facilitated plaque removal from the press platens. Feedstock was either ground polymer or finely cut pieces from the Rheomix. Strips for resistivity measurement about 1.3 centimeter wide and 15 centimeters long were cut from the plaques which were about 1 mm thick.

The molding cycle used to prepare the plaques was typically:
1. Charge—55 grams, press preheated to 350° C.
2. Polymer in chase in press—no pressure—10 min.
3. Low pressure—2000 pounds (907 Kg)—4 min.
4 High pressure—20,000 pounds (9072 Kg)—6 min.
5. Quench—cold water.

NOTE: These "pressures" are forces on the hydraulic cylinder. In view of the size of the cylinder and the area of the chase, 2000 pounds (907 Kg) corresponds to 57 psi (393 KPa) on the polymer.

In all the Comparative Examples, the copolymer employed in the conductive composition had more than 135 total —COOH and —COF groups per $10^6$ carbon atoms. In all the related examples of the invention, the copolymer employed in the conductive composition had been amine treated until the number of —COOH and —COF groups was less than 7 per $10^6$ carbon atoms.

EXAMPLES

Example 1

A tetrafluoroethylene/hexafluoropropylene (TFE/HFP) copolymer, 12.6 weight percent HFP, in aqueous dispersion form was obtained by polymerizing TFE and HFP in an aqueous medium according to the general procedure of U.S. Pat. No. 4,380,618 using ammonium persulfate initiator and ammonium perfluorocaprylate surfactant. The copolymer was coagulated by using 1320 ml dispersion (26% solids) diluted with 430 ml of demineralized water in a 3.5-liter stainless-steel beaker (152 mm in diameter) equipped with four equally spaced, rectangular baffles protruding 13 mm into the beaker. The agitator impeller had four 34 mm×17 mm×3.2 mm thick blades welded onto a 17 mm diameter hub at 35° to 40° pitch from horizontal to pump upward when rotated clockwise. Impeller diameter was 85 mm. The contents were agitated at 500 rpm and 10 ml of 70 weight percent nitric acid was then added to produce a thick gel. After three minutes the agitator speed was increased to 1500 rpm and 180 ml of CFC 113 was added to break the gel and granulate the polymer. Agitation was stopped 10 minutes later. The aqueous phase was poured off, 1000 ml of demineralized water was added to the polymer/organic phase, and the polymer was agitated for five minutes at 500 rpm. The aqueous phase was again poured off and the polymer was dried in a 150° C. air oven. This gave a bead polymer with an average particle size of about 1500 micrometers and a melt viscosity of $9.7 \times 10^4$ poise at 372° C.

A) A 25 g sample of the above polymer was placed in a vertical tube reactor and heated at 165°–175° C. for 90 minutes with an upward flow of 100 cc/min of preheated nitrogen, which had been previously bubbled through 50 ml of 28% ammonium hydroxide solution. This was followed by 30 minutes with pure nitrogen.

B) A second 25 g sample of the bead polymer described above was treated in the same manner except that the nitrogen was sparged through a solution of 5 ml of diethylamine in 50 ml of water. The nitrogen flow, temperature and times were the same as for A above.

C) A third sample of this same bead polymer was exposed to humid air at about 360° C. for thirty minutes to remove unstable groups (a stabilization process taught in U.S. Pat. No. 3,085,083).

Thin films (250±5 micrometers) of each of these treated polymers plus one of the untreated bead polymer were compression molded at 350° C. and IR scans run to determine end groups. The results were as follows:

TABLE 3

| Polymer | —COOH | —COF | —CONH2 |
|---|---|---|---|
| Untreated | ca. 100 | 0 | 0 |
| A - Ammonia | ca. 10 | 0 | ca. 90 |
| B - Diethylamine | <5 | 0 | 0 |
| C - Humid/heat | ca. 5 | ca. 10 | 0 |

Example 2

A) A 0.25 mm film made from the untreated bead polymer of Example 1 was suspended over 28% ammonium hydroxide in a capped 8 ounce glass jar for three days at room temperature. IR scans showed that the carboxylic acid groups (absorption at 1775 and 1810 cm$^{-1}$) had been nearly completely converted to the ammonium salt (absorption at 1685 cm$^{-1}$). This film was then heated in air at 150° C. for two hours. An IR scan of this polymer was nearly identical to that of the initial polymer before treatment with ammonium hydroxide.

B) A second 0.25 mm film of the untreated polymer of Example I was suspended in the vapor space of a flask of refluxing diethylamine for three hours. An IR scan of the resulting polymer film showed that most but not all of the carboxylic acid groups had been converted to the amine salt (strong absorption at 1690 cm$^{-1}$ with weak absorption at 1770 and 1810 cm$^{-1}$). This film was then heated at 200° C. for one hour. An IR scan of the resulting film showed that the amine salt groups had decarboxylated, leaving only the weak absorption at 1770 and 1810 cm$^{-1}$.

Example 3

Into each of nine 30 ml serum bottles was placed 30 g of tetrafluoroethylene/hexafluoropropylene copolymer similar to that of Example 1 (12.0 weight percent HFP and melt viscosity=$3.7 \times 10^4$ poise at 372° C. with about 1200 micrometer bead size). A TEFLON® lined serum stopper was placed on each bottle and secured with a crimped on aluminum serum cap. Each bottle was evacuated through a hypodermic needle with house vacuum. Then 10 microliters of the indicated amine (see below) was injected into the bottle and the bottles were placed in a 200° C. air oven for two hours. The bottles were removed, cooled and opened. A 250±5 micrometer (0.25 mm) film was prepared for each sample and an IR scan obtained with the following results:

TABLE 4

| Sample | Amine Used | pKa | Reactive Groups Found —COOH | Amide |
|---|---|---|---|---|
| 1 | Diethylamine | 10.49 | <5 | 0 |
| 2 | Triethylamine | 11.01 | <5 | 0 |
| 3 | Piperidine | 11.12 | <5 | 0 |
| 4 | Pyridine | 5.25 | 40 | 0 |
| 5 | n-Butylamine | 10.77 | 20 | 40 |
| 6 | n-Hexylamine | 10.56 | 40 | 15 |
| 7 | Dodecyl dimethyl amine | >10 | <5 | 0 |
| 8 | Aniline | 4.63 | 100 | 40 |
| 9 | Benzyl dimethyl amine | >10 | <5 | 0 |

TABLE 4-continued

| Sample | Amine Used | pKa | Reactive Groups Found —COOH | Amide |
|---|---|---|---|---|
| 10 | Untreated film | — | 150 | 0 |

Example 4

A) A tetrafluoroethylene/hexafluoropropylene copolymer very similar to that of Example 1 was pelletized by the process of Example 1 using 10 ml of nitric acid to gel the dispersion.

B) The same procedure was repeated, except that 10 ml of diethylamine was used to gel the dispersion.

A 0.25 mm film was prepared from each polymer and reactive groups were determined by IR.

TABLE 5

| Polymer | Gelling Agent | Reactive Groups Detected —COOH | Others |
|---|---|---|---|
| A | Nitric Acid | 120 | None |
| B | Diethylamine | less than 5 | None |

Example 5

Into a 2 liter Paar reactor (heavy walled stainless steel vessel) were placed 455 g of a TFE/PPVE copolymer (about 3 weight percent PPVE; melt viscosity $= 3.5 \times 10^4$ poise at 372° C.), 200 cc of demineralized water and 5 cc of diethyl amine. The reactor was evacuated with house vacuum for 10 minutes and repressured to atmospheric pressure with nitrogen. The reactor was then heated to 250° C. (reactor pressure was 3.8 kPa) and held at that temperature for four hours. After slowly cooling to room temperature the polymer was recovered and washed once in water and then in a 50/50 mixture of acetone and water (slurried in 1 liter of wash liquid for 5 minutes), isolated, and finally dried in a 100° C. vacuum oven. Thin films (about 0.25 mm) were prepared of both the treated and untreated copolymer and reactive groups were determined by FTIR. The results are given in the table below.

TABLE 6

| Sample | Reactive Groups (per $10^6$ carbons) | | |
|---|---|---|---|
| | —COOH | —COF | —CF$_2$H |
| Untreated | 84 | 62 | 50 |
| Treated | 0 | 0 | 160 |

Example 6

Into a 99 liter double cone blender was placed 25 kg of TFE/PPVE copolymer (about 3 weight percent PPVE; melt viscosity $= 1.9 \times 10^4$ poise at 372° C.), 100 cc of demineralized water and 25 cc of diethyl amine. The blender was closed and tumbled for 30 minutes at 3.5 rpm. It was then evacuated twice to 25 cm of mercury vacuum using nitrogen to bring the pressure back to atmospheric each time. The blender and contents were then heated (external electrical heaters) to 200° C., with venting when necessary to maintain a pressure of about 35 kPa while rotating at 3.5 rpm. After four hours at 200° C. the blender was purged with nitrogen at 200° C. for one hour and then cooled to 30° C. The polymer was removed and a thin film (about 0.25 mm) was prepared for reactive group analysis by FTIR, along with a sample of untreated polymer. The results are given in the table below.

TABLE 7

| Polymer | Reactive Groups (per $10^6$ Carbons) | | |
|---|---|---|---|
| | —COOH | —COF | —CF$_2$H |
| Untreated | 67 | 69 | 52 |
| Treated | 0 | 6 | 248 |

Example 7

A 36 liter horizontal polymerization kettle equipped with a paddle type agitator was charged with 21.8 kg of demineralized water and heated to 60° C. The polymerization kettle was evacuated and pressured to a slight positive pressure with TFE. The evacuation followed by TFE addition was repeated a second time, and then the polymerization kettle was evacuated a third time. To the evacuated polymerization kettle were added 25 g of ammonium sulfite and 80 g of Asahi Glass "Surflon" S111s fluorosurfactant (which is substantially ammonium perfluorononanoate) dissolved in 1000 ml of demineralized water.

With the agitator at 60 rpm, 825 g of liquid PDD was pressured into the polymerization kettle to give a pressure of 55 kPa. Then, TFE was added to a pressure of 131 kPa. After both monomers were added, 100 ml of ammonium persulfate (APS) solution (70 g/l) was added rapidly, and then its addition was continued at a rate of 2 ml/min until a total of 28.6 g. of APS had been added. After 41 minutes, a 34 kPa pressure drop had occurred, indicating that polymerization had started. From this point, PDD monomer was added at a uniform continuous rate of 1750 g/hour and TFE at a rate of 100 g/hour until a total of 5600 g of PDD had been added after the initial pressure drop; then, addition of both monomers was stopped. After a further pressure drop of 20 kPa occurred, the ammonium persulfate addition was stopped; the polymerization kettle was vented; and the contents were recovered.

A 26.1 kg portion of the cooled product dispersion, which contained 15.3% copolymer solids, along with 4.5 kg of demineralized water, was transferred into a 106 liter steam-jacketed, stainless-steel coagulator equipped with a 23 cm (tip to tip), 45° angle, four-bladed turbine agitator. The agitator was turned on at 350 rpm, and 57 g of diethylamine was added. The dispersion gradually thickened into a gel. After 30 minutes, 2200 ml of CFCl$_2$—CF$_2$Cl (CFC 113) was poured slowly into the coagulator. The gel immediately separated into copolymer and water phases. After the agitator was shut off and settling occurred, the water was drawn off and the copolymer/organic phase was washed twice with 22.7 kg portions of fresh water for 10 minutes while agitating at 250 rpm. After removal of the second wash water, 34 kg of fresh demineralized water was added and the reactor contents were heated slowly to 55° C. to boil off the CFC 113. When CFC 113 evolution ceased, the copolymer and water were drained from the bottom of the coagulator and filtered. The recovered copolymer was dried in a 120° C. vacuum oven. This copolymer had a Tg of 247° C. The dried product had an inherent viscosity of 1.76 and had an acid fluoride content of 4.4 meg/kg.

A portion of the dry polymer was placed in a chamber which was evacuated, purged with nitrogen, and then heated to 160° C. A 25/75 v/v fluorine/nitrogen gas mixture was then passed over the copolymer for six hours while maintaining the 160° C. temperature. The gas flow amounted to 0.041 part of fluorine per part of polymer. The chamber was then purged with nitrogen and cooled, and the copolymer granules were removed from the chamber. The fluorine-treated resin had an inherent viscosity of 1.33. The granules were then stored at 20°–25° C. until being compression molded at 300° C. into approximately 0.25 mm thick films. These films showed an acid fluoride content of 12.3 meq/kg of copolymer and also contained some absorbance at 1813 cm$^{-1}$ attributable to carboxylic acid groups.

One of these films was placed in the Paar reactor (see Example 5) along with 500 ml of demineralized water and 2 ml of diethylamine. The reactor was heated to 220° C. for four hours and then cooled to room temperature. The film was recovered, washed with a 50/50 acetone/water mixture and dried in a 100° C. vacuum oven for two hours. This film was analyzed for reactive groups by FTIR with the following results.

TABLE 8

| Sample | Reactive Groups (meq/kg) | |
|---|---|---|
| | —COF | —COOH |
| Untreated | 12.3 | 6 |
| Treated | 0 | 0 |

Example 8

About 250 grams of a 368.6 gram charge of Copolymer A, diethyl amine treated TFE/PPVE (3 weight percent PPVE, MFN=15.2) pellets, was melted in a Haake mixer (supra) with control temperature set at 350° C. and rotor speed 15 rpm. When the polymer was molten, 11.4 grams of conductive carbon black (DJ-600 KETJENBLACK) was added to the mixing bowl and the plunger lowered to force the carbon into the melt. After the carbon appeared to be well distributed in the melt, the remainder of the polymer was added. The rotor speed was 15 rpm until the melt temperature reached 335° C. Rotor speed was then increased to 60 rpm for five minutes at which time the temperature was 346° C. The rotor was stopped and the blend removed from the mixer.

Comparative Example 8A

About 250 grams of a 368.6 gram charge of TFE/PPVE Copolymer A not treated with amine was melted in the mixer with control temperature set at 350° C. and rotor speed at 15 rpm. When the polymer was molten, 11.4 grams of conductive carbon black (DJ-600 KETJENBLACK) was added to the mixing bowl and the plunger lowered to force the carbon into the melt. After the carbon appeared to be well distributed in the melt, the remainder of the polymer was added. The rotor speed was 15 rpm until the melt temperature reached 333° C. Rotor speed was then increased to 60 rpm for five-minutes at which time the temperature was 354° C. The rotor was stopped and the blend removed from the mixer.

Example 9

About 250 grams of a 353.4 gram charge of diethylamine treated TFE/PPVE Copolymer B (3 weight percent PPVE, MFN=12.8) was melted in the mixer with control temperature set at 350° C. and rotor speed at 15 rpm. When the polymer was molten, 26.6 grams of conductive carbon black ("VULCAN" XC-72) was added to the mixing bowl and the plunger lowered to force the carbon into the melt. After the carbon appeared to be well distributed in the melt, the remainder of the polymer was added. The rotor speed was at 15 rpm until the melt temperature reached 335° C. Rotor speed was then increased to 60 rpm for five minutes at which time the temperature was 346° C. The rotor was stopped and the blend removed from the mixer.

Comparative Example 9B

About 250 grams of a 353.4 gram charge of untreated TFE/PPVE Copolymer B was melted in the mixer with control temperature set at 350° C. and rotor speed at 15 rpm. When the polymer was molten, 26.6 grams of conductive carbon black ("VULCAN" XC-72) was added to the mixing bowl and the plunger lowered to force the carbon into the melt. After the carbon appeared to be well distributed in the melt, the remainder of the polymer was added. The rotor speed was at 15 rpm until the melt temperature reached 336° C. Rotor speed was then increased to 60 rpm for five minutes at which time the temperature was 360° C. The rotor was stopped and the blend removed from the mixer.

Example 10

About 250 grams of a 368.6 gram charge of diethylamine treated TFE/PPVE Copolymer C (3 weight percent PPVE, MFN=28.4) pellets was melted in the mixer with control temperature set at 350° C. and rotor speed 15 rpm. When the polymer was molten, 11.4 grams of the conductive carbon black (DJ-600 KETJENBLACK) was added to the mixing bowl and the plunger lowered to force the carbon into the melt. After the carbon appeared to be well distributed in the melt, the remainder of the polymer was added. The rotor speed was 15 rpm until the melt temperature reached 334° C. Rotor speed was then increased to 60 rpm for five minutes at which time the temperature was 341° C. The rotor was stopped and the polymer blend removed from the mixer.

Comparative Example 10C

About 250 grams of a 368.6 gram charge of untreated TFE/PPVE Copolymer C was melted in the mixer with control temperature set at 350° C. and rotor speed at 15 rpm. When the polymer was molten, 11.4 grams of conductive carbon black (DJ-600 KETJENBLACK) was added to the mixing bowl and the plunger lowered to force the carbon into the melt. After the carbon appeared to be well distributed in the melt, the remainder of the polymer was added. The rotor speed was 15 rpm until the melt temperature reached 335° C. Rotor speed was then increased to 60 rpm for five minutes at which time the temperature was 352° C. The rotor was stopped and the blend removed from the mixer.

Example 11

About 250 grams of a 342 gram charge of diethylamine treated TFE/PPVE Copolymer C (3 weight percent PPVE, MFN=28.4) pellets was melted in the mixer with control temperature set at 350° C. and rotor speed 15 rpm. When the polymer was molten, 38 grams of conductive carbon black ("VULCAN" XC-72) was added to the mixing bowl and the plunger lowered to force the carbon into the melt. After the carbon appeared to be well distributed in the melt, the remainder of the polymer was added. The rotor speed was 15 rpm until the melt temperature reached 330° C. Rotor speed was then increased to 60 rpm for five minutes at which time the temperature was 344° C. The rotor was stopped and the polymer blend removed from the mixer.

Comparative Example 11D

About 250 grams of a 342 gram charge of untreated TFE/PPVE Copolymer C was melted in the mixer with control temperature set at 350° C. and rotor speed at 15 rpm. When the polymer was molten, 38 grams of conductive carbon black ("VULCAN" XC-72) was added to the mixing bowl and the plunger lowered to force the carbon into the melt. After the carbon appeared to be well distributed in the melt, the remainder of the polymer was added. The rotor speed was 15 rpm until the melt temperature reached 338° C. Rotor speed was then increased to 60 rpm for five minutes at which time the temperature was 358° C. The rotor was stoped and the blend removed from the mixer.

TABLE 9

| Copolymers Used in Conductive Compositions | | |
|---|---|---|
| | —COF | —COOH |
| Copolymer A | | |
| Untreated | 62 | 84 |
| Treated | 0 | 0 |
| Copolymer B | | |
| Untreated | 120 | 38 |
| Treated | 0 | 0 |
| Copolymer C | | |
| Untreated | 68 | 70 |
| Treated | 6 | 0 |

TABLE 10

RESISTIVITY AND MELT FLOW NUMBER
OF AMINE TREATED COPOLYMER AND CONTROLS

| Example | Carbon Black* | % | Resistivity (ohm-cm) | Melt Flow Number (g/10 min) |
|---|---|---|---|---|
| Comp. 8A | DJ-600 | 3 | 58.0 | 3.4 |
| Example 8 | DJ-600 | 3 | 7.0 | 6.2 |
| Comp. 9B | XC-72 | 7 | >10$^9$ | 1.4 |
| Ex. 9 | XC-72 | 7 | 28.0 | 6.0 |
| Comp. 10C | DJ-600 | 3 | 24.0 | 7.5 |
| Ex. 10 | DJ-600 | 3 | 8.8 | 10.9 |
| Comp. 11D | XC-72 | 10 | >10$^9$ | 1.1 |
| Ex. 11 | XC-72 | 10 | 7.7 | 5.5 |

*DJ-600 is KETJENBLACK from AKZO
XC-72 is VULCAN from Cabot

We claim:
1. Composition consisting essentially of
   (a) a copolymer of at least two comonomers selected from the group consisting of tetrafluoroethylene; chlorotrifluoroethylene; $R_fCF=CF_2$ wherein $R_f$ is a primary fluoroalkyl group of 1-5 carbon atoms; $R_gOCF=CF_2$ wherein $R_g$ is $R_f$ or a primary fluoroalkyl group containing ether oxygen and 4-12 carbon atoms; and a fluorodioxole of the formula

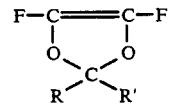

wherein each of R and R', independently, is fluorine or trifluoromethyl; said copolymer having —CF$_2$H groups and being substantially free of —COF and —COOH groups, provided that if the copolymer contains only two comonomers, one of which is tetrafluoroethylene, then the other comonomer cannot be $R_fCF=CF_2$; and
   (b) 1-20 weight percent, based on the weight of the composition, of conductive carbon black.
2. Composition of claim 1 in which the copolymer is melt processible.
3. Composition of claim 1 in which the copolymer is a copolymer of tetrafluoroethylene and perfluoro(propyl vinyl ether).
4. Composition of claim 1 in which the amount of carbon black is 1-6 weight percent.